United States Patent [19]

Nagao et al.

[11] Patent Number: 5,528,960
[45] Date of Patent: Jun. 25, 1996

[54] POWER TRANSMISSION APPARATUS

[75] Inventors: Toru Nagao, Utsunomiya; Hidemi Matsuda, Kawachi; Takao Kojima, Kanuma, all of Japan

[73] Assignee: Fuji Jukogyo Kabushiki Kaisha, Tokyo, Japan

[21] Appl. No.: 415,738

[22] Filed: Apr. 3, 1995

[30] Foreign Application Priority Data

Apr. 19, 1994 [JP] Japan .................................. 6-080475

[51] Int. Cl.⁶ ..................................................... F16H 1/26
[52] U.S. Cl. ...................................................... 74/665 GD
[58] Field of Search ........................... 74/665 F, 665 GB, 74/665 GC, 665 GD

[56]     References Cited

U.S. PATENT DOCUMENTS 2,506,855  5/1950  Casse .................................. 74/665 GD

*Primary Examiner*—Dirk Wright
*Attorney, Agent, or Firm*—Beveridge, DeGrandi, Weilacher & Young

[57]     ABSTRACT

A jacket having a pair of small helical gears is spline-fitted around a splined shaft. Since the small helical gears have an adverse helix angle to each other, the jacket moves along the spline shaft in the axial direction so as to distribute an equal torque to both small helical gears. The splited torque is transmitted to a pair of drive shafts each of which drives the main rotor of a helicopter through a combination of gear and pinion. The drive shafts are fixed axially and therefore helical gears or double-helical gears can be used in the combination of gear and pinion. Consequently the power transmission apparatus according to the present invention provides a light and compact structure,

14 Claims, 4 Drawing Sheets

POWER TRANSMISSION APPARATUS

BACKGROUND OF THE INVENTION

1. Field of the Invention

The present invention relates to a power transmission apparatus for helicopter and more particularly to a power transmission apparatus for transmitting torque and rotational movement generated in an engine to a main rotor of a helicopter.

2. Description of the Prior Art

In the helicopter, since a Mach number of the rotary wing can not be raised so high, a power transmission apparatus or simply referred to as so-called "transmission" needs a large reduction gear ratio, especially in case where a gas turbine engine is used. FIG. 6 is a schematic view showing a typical arrangement of the power train system in the helicopter, in which an output shaft 2 of an engine 1 is connected to a power transmission apparatus 3. A drive shaft 4 for driving a main rotor 5 and a tail rotor drive shaft 6 for driving a tail rotor 7 are extended from the power transmission apparatus 3. Further, power is transmitted from the power transmission apparatus 3 to auxiliary devices too such as generators, hydraulic pumps and the like.

Because of the nature of components for aircraft, compactness and light weight are essential factors in designing the power transmission apparatus of the helicopter. To attain this requirement, for example a literature (A 2400 Kw Light Weight Helicopter Transmission With Split-Torque Gear Trains: ASME 84-DET-91) discloses a construction using a pair of gear trains. Namely, as shown in FIG. 4, a gear wheel 9 is fixedly secured to a drive shaft 4 of main rotor and a pair of pinions 10 meshes with the gear wheel 9. Further, a pair of medium gears 11 is coaxially mounted on each of pinions 10 and meshes with a pinion 12. In a gear train thus constituted, an engine torque is transmitted to a shaft 13 of the pinion 12 through a helical bevel gear 14 and further it is transmitted to the gear 9 through the pair of medium gears 11 and the pair of pinions 10. Thus, since a torque is splited to each of pinions 10, the power transmission apparatus according to the prior art can attain compactness and light weight. In this example of prior art as illustrated in FIG. 4, another pair of pinions meshes with the gear 9 oppositely thereto. This pair of pinions is for another power source and has no relation to the description of the present invention.

However, in this prior art there is a disadvantage that an equal torque splitting is realized only when all of gears constituting the gear train system meet individual specifications accurately. In an actual world, because of manufacturing tolerances, the equal torque splitting is very difficult to be realized.

In order to solve this problem, mechanisms for equalizing input torque have ever been proposed. For example, a literature (Split Torque Transmission Load Shearing: NASA TM-105884) discloses a torque split apparatus in which, as shown in FIG. 5, a helical pinion 16 is provided on an input shaft 15 and a pair of medium helical gears 17 meshes with the helical pinion 16. Shafts 18 of the medium helical gears 17 are sheathed with a pinion 19 meshed with a gear 9 respectively. These shafts 18 are constituted so as to be axially slidable and upper ends thereof are connected with a balance beam 20 respectively. The balance beam 20 acts as balancing a thrust force produced in one shaft 18 with a thrust force produced in another shaft 18, whereby a torque is equally distributed.

However, in this torque split apparatus since the shafts 18 are constituted to be axially slidable when an unbalance occurs in making torque distribution, other types of gears than spur gear can not be used for the pinion 19. Therefore, in this prior it is difficult to achieve a weight reduction by making use of a more compact gear such as helical gear or double-helical gear.

Further, there is another problem in this torque split apparatus such as needing a complicated mechanism like a balance beam 20 including two movable elements therein, as illustrated in FIG. 5.

SUMMARY OF THE INVENTION

In view of the foregoing disadvantages, it is an object of the present invention to provide a power transmission apparatus for helicopter whose weight is right, whose size is compact and whose mechanism is simplified.

It is a further object of the present invention to provide a torque split apparatus capable of splitting a torque exactly into half with a simple mechanism.

To accomplish the above first object of the present invention, the power transmission apparatus according to the present invention comprises: a gear wheel fixedly secured to a main drive shaft for transmitting a power to a main rotor of a helicopter; a first drive shaft rotatably mounted on and axially fixed to a transmission case of the helicopter; a first pinion fixedly secured to a first drive shaft and meshing with the gear wheel; a first large helical gear secured to the first drive shaft coaxially with the first pinion; a second drive shaft rotatably mounted on and axially fixed to the transmission case; a second pinion fixedly secured to the second drive shaft and meshing with the gear wheel; a second large helical gear secured to the second drive shaft coaxially with the second pinion; a splined shaft rotatably mounted on and axially fixed to the transmission case for inputting the power therefrom; a jacket spline-fitted to the splined shaft so as axially to slide along the splined shaft and so as to receive the power from the splined shaft; a first small helical gear fixedly secured to the jacket coaxially with the splined shaft and meshing with the first large helical gear for splitting the power into a half and transmitting the half of the power to the first drive shaft through the first large helical gear; and a second small helical gear fixedly secured to the jacket coaxially with the input shaft and meshing with the second large helical gear for splitting the power into a half and transmitting the half of the power to the second drive shaft through the second large helical gear. Further, the above-mentioned first object is accomplished by the following additional construction, wherein the first small helical gear has the same diameter, the same number of teeth as and an opposite helix angle to the second small helical gear, and the first large helical gear has the same diameter, the same number of teeth as and an opposite helix angle to said second large helical gear.

Furthermore, to accomplish the above second object of the present invention, the torque split apparatus included in the power transmission apparatus according to the present invention comprises: a splined shaft rotatably mounted on and axially fixed to a housing of the torque split apparatus for inputting a torque; a jacket spline-fitted to the splined shaft so as axially slide along the splined shaft and so as to receive the torque from the splined shaft; a first driven helical gear fixedly secured to the first drive shaft; a second driven helical gear fixedly secured to the second drive shaft; a first drive helical gear fixedly secured to the jacket coaxially with the splined shaft and meshing with the first driven helical gear for splitting the torque into a half and transmitting the half of the torque to said first drive shaft through the first driven helical gear; and a second drive helical gear fixedly secured to the jacket coaxially with the splined shaft and meshing with the second driven helical gear for splitting the torque into a half and transmitting the half of the torque to the second drive shaft through the second driven helical gear.

DESCRIPTION OF THE PREFERRED EMBODIMENTS

Figure 1:
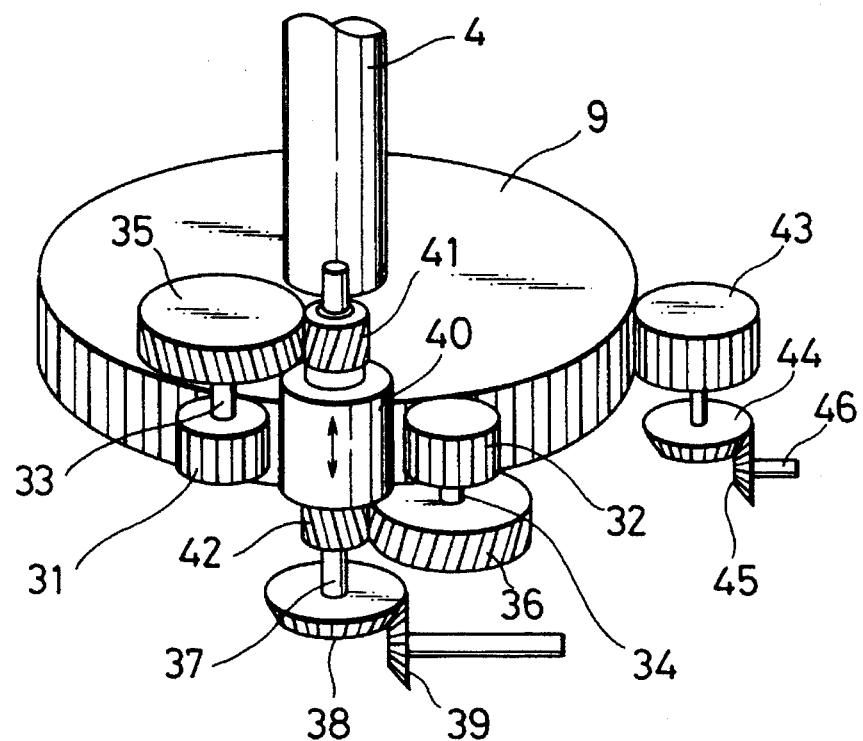
FIG. 1 is a perspective schematic view showing a major part of a power transmission apparatus according to a first embodiment of the present invention.
Figure 2:
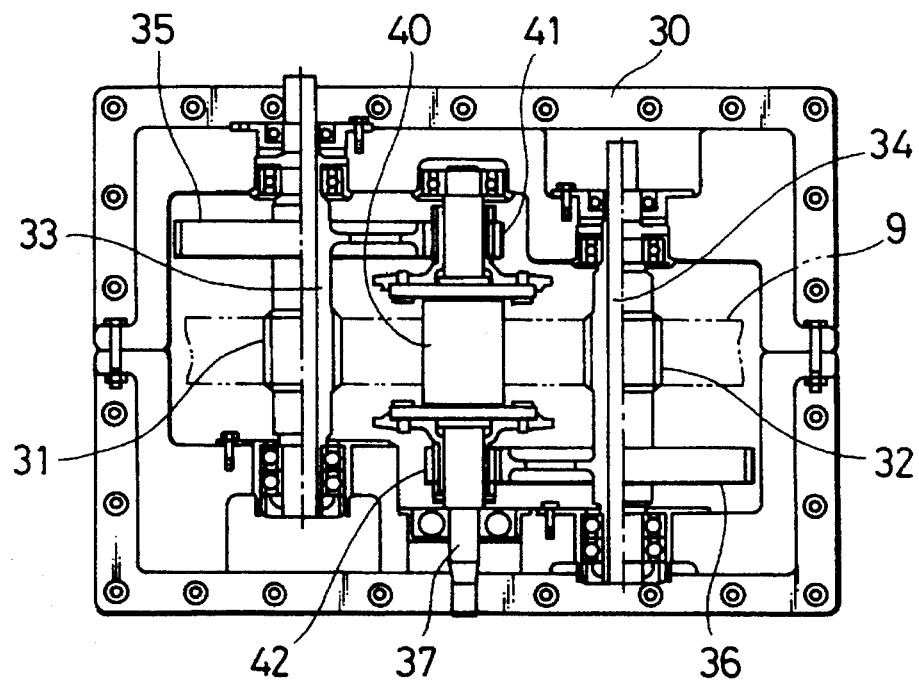
FIG. 2 is a cross-sectional view of a power transmission apparatus according to a first embodiment of the present invention.

Referring now to FIG. 1, a gear wheel 9 is fixedly secured to a drive shaft 4 of a main rotor. The gear wheel 9 meshes with a pair of pinions comprising a first pinion 31 and a second pinion 32 which are arranged at a given distance each other, having the same diameter and the same number of teeth. The pinions 31 and 32 are fixed to a first drive shaft 33 and a second drive shaft 34 respectively and the shafts 33 and 34 are rotatably mounted on and axially fixed to a transmission case 30 (shown in FIG. 2). Gear teeth of the gear wheel 9, the pinions 31 and 32 may be any type of gears, spur gears, helical gears and double-helical gears. A first large helical gear 35 is fixedly secured at an upper portion of the shaft 33 of the pinion 31 and a second large helical gear 36 is fixedly secured at a lower portion of the shaft 34 of the pinion 32. The first large helical gear 35 has the same diameter, the same number of teeth as and an opposite helix angle to the second large helical gear 36.

Numeral 37 denotes an input shaft to which an engine torque is transmitted from outside of the transmission case 30. A lower end of the input shaft 37 is connected with an output shaft of the engine through bevel gears 38 and 39 respectively, as illustrated in FIG. 1. Splines are provided on the outer periphery of the input shaft 37. Further, a jacket 40 has also splines on an inner periphery thereof and is spline-fitted around the input shaft 37 so as to receive a torque from the input shaft 37 through the mated pairs of splines, while the torque being transmitted from the input shaft 37 to the jacket 40 securely through the mated pairs of splines. Further, a first small helical gear 41 is fixedly secured to an upper portion of the jacket 40 coaxially with the input shaft 37 and meshes with the first large helical gear 35. Also a second small helical gear 42 is fixedly secured to a lower portion of the jacket 40 coaxially with the input shaft 37 and meshes with the second large helical gear 36. Since the first small helical gear 41 has the same diameter, the same number of teeth as and an opposite helix angle to the second small helical gear 42, an adverse thrust force is exerted between the first and second small helical gears 41 and 42. Furthermore, a gear 43 meshes with a gear wheel 9 to rotate a drive shaft 46 for tail rotor through bevel gears 44 and 45.

In the first embodiment thus constituted, a torque generated in engine is transmitted to the main rotor in the following manner:

A torque inputted to the input shaft 37 is transmitted to a pair of small helical gears 41 and 42 through the jacket 40. Here the torque is splited into two, that is to say, one is transmitted to the shaft 33 via the first large helical gear 35 meshing with the first small helical gear 41 and the other is transmitted to the shaft 34 via the second large helical gear 36 meshing with the second small helical gear 42. Finally each splited torque is transmitted to the drive shaft 4 for main rotor fixed to the gear wheel 9 meshing with the first pinion 31 and the second pinion 32 respectively.

The jacket 40 is constituted so as to move up and down according to the difference of the thrust forces generated in the adverse direction each other between the first small helical gear 41 and the second small helical gear 42. Therefore, when a torque is splited equally between the first helical gear 41 and the second helical gear 42, the thrust force is balanced with each other and the jacket 40 does not move in any direction.

On the other hand, when the torque is uneqally splited between the small helical gears 41 and 42, the thrust force is exerted on the small helical gear subjected to the smaller torque and the jacket 40 is moved in the direction of that small helical gear. Then, the torque becomes large on the side of the small helical gear newly exerted by a larger thrust force and because of this the jacket 40 is moved back so as to decrease that thrust force. Thus, the jacket 40 is always moved to the position where the thrust force is balanced and as a result the torque is distributed equally.

Figure 5:
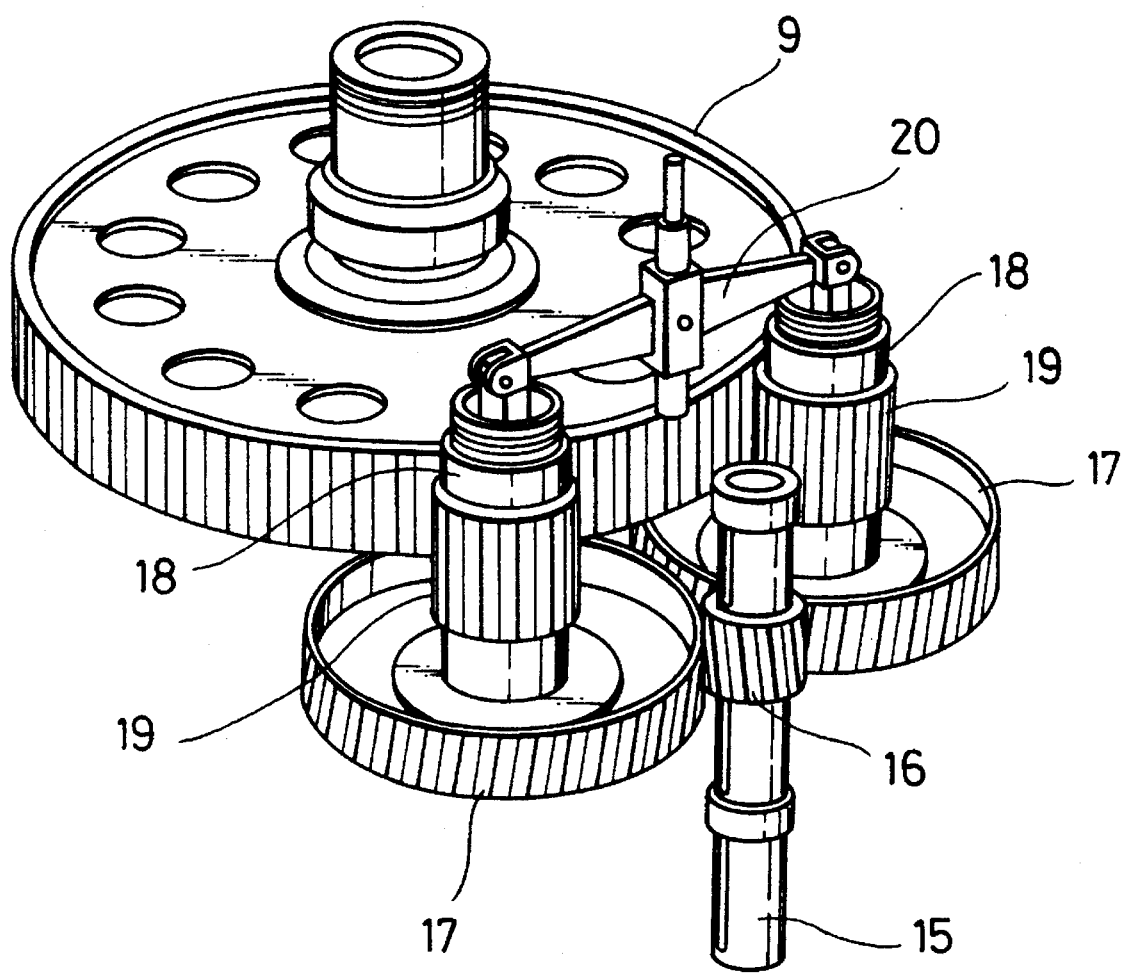
FIG. 5 is a perspective schematic view showing a major part of a power transmission apparatus according to another example of the prior art.
Figure 6:
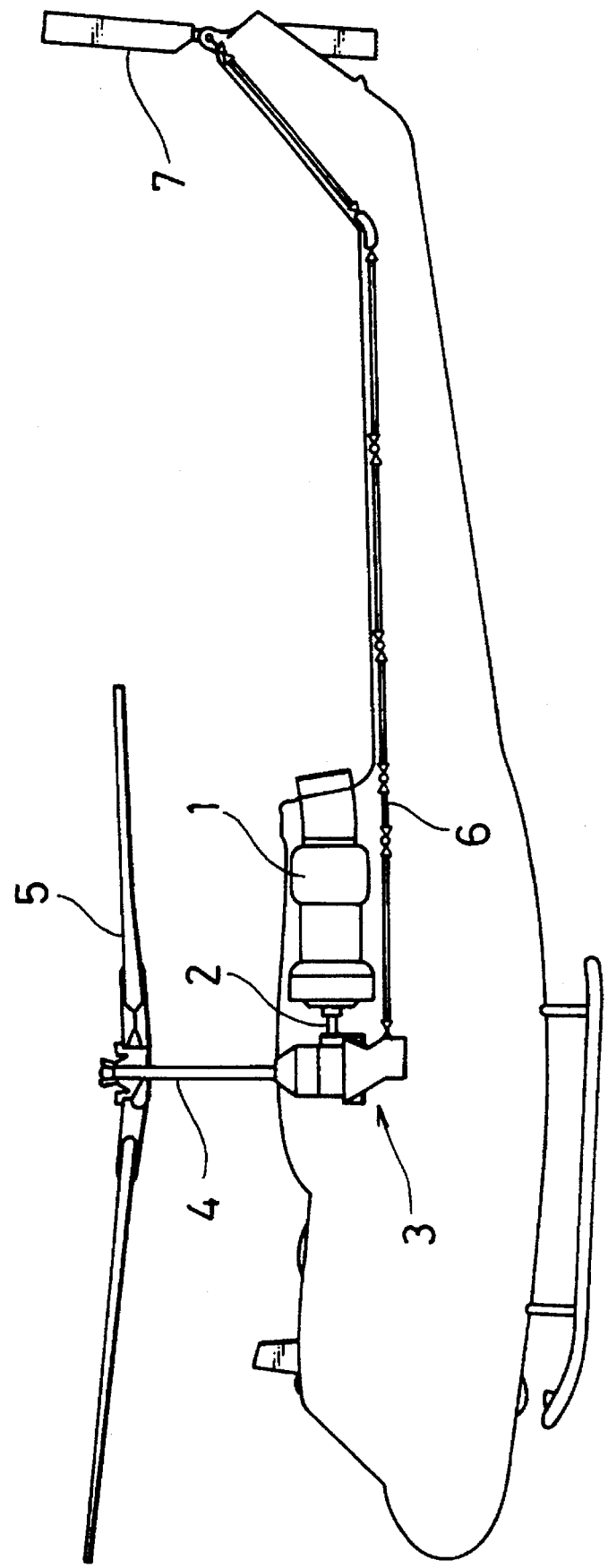
FIG. 6 is a schematic view showing a typical layout of a power train system in helicopter.

As described above, in the first embodiment since the moving part of the power transmission apparatus is only the jacket 40 equipped with the first helical gear 41 and the second helical gear 42, the mechanism can be simplified compared to the prior art in FIG. 5. Further, since the shafts 33 and 34 do not move in the axial direction, the pinions 31 and 32 may be helical or double-helical gear, therefore it is possible to make the apparatus lighter in weight and more compact in size.

Figure 3:
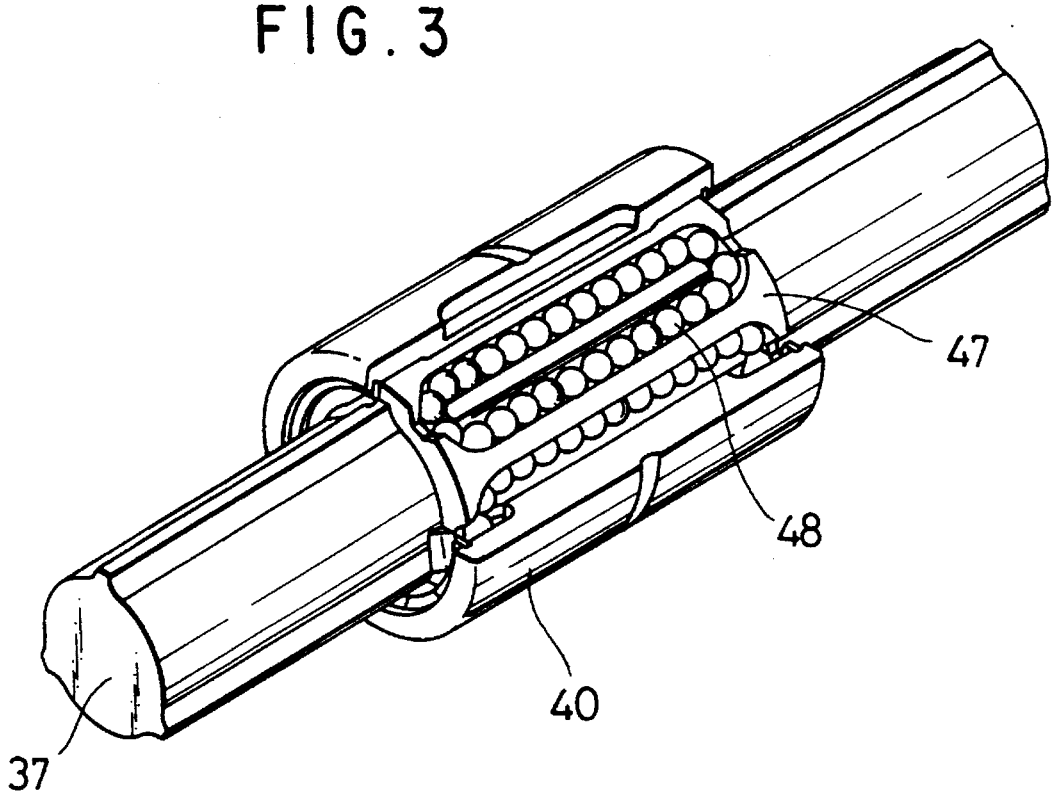
FIG. 3 is a perspective view showing a major component of a power transmission apparatus according to a second embodiment of the present invention.
Figure 4:
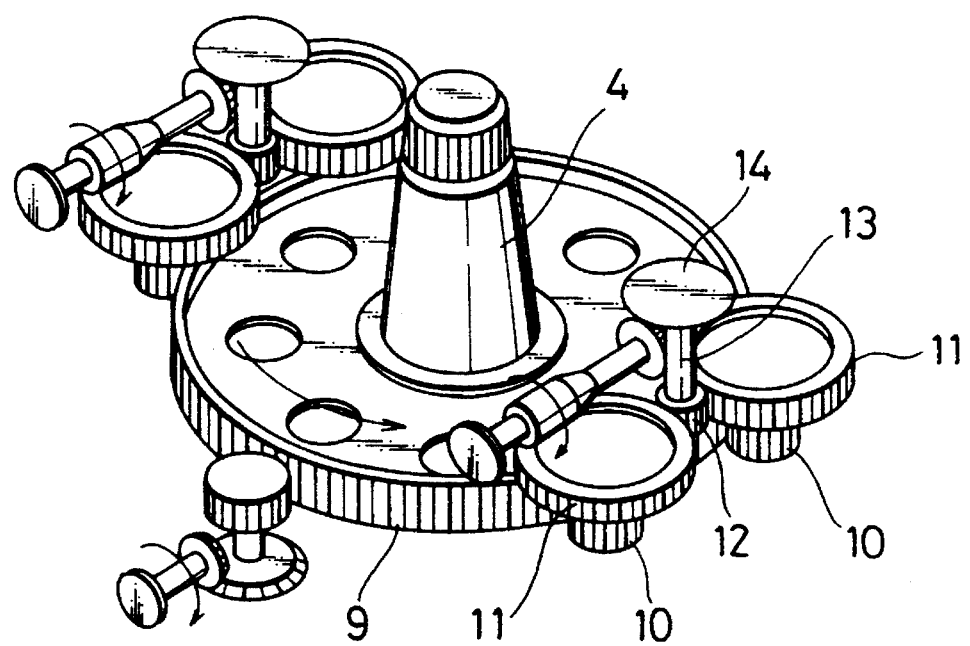
FIG. 4 is a perspective schematic view showing a major part of a power transmission apparatus according to an example of the prior art.

Next, referring to FIG. 3, the power transmission apparatus according to the second embodiment will be described. In this embodiment a ball spline is employed for the jacket 40. The input shaft 37 is a spline shaft as illustrated in FIG. 3. The jacket 40 comprises a retainer 47 and a plurality of balls 48 held in grooves of the retainer 47.

The ball spline thus constituted has a very low friction, for example one-hundredth to one-fiftieth of the friction for an ordinal spline. Therefore, this second embodiment employing the ball spline can provide a more equal torque splitting than the first embodiment employing the ordinal spline. In this second embodiment, if a resin coating is applied to the input shaft 37, a further lower friction and therefore a more equal torque splitting can be obtained.

A torque split mechanism included in the power transmission apparatus according to the present invention can be applied to other power transmission apparatuses than the one for helicopter.

In summary, a jacket having a pair of helical gears at both ends thereof, the helical gears having adverse helix angle to each other, moves along the shaft in the axial direction so as to distribute an equal torque. Since helical gears or double-helical gears can be used for the gears transmitting a torque to the main rotor, the power transmission apparatus according to the present invention provides a light and compact structure.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power transmission apparatus mounted on a helicopter for mechanically transmitting a power generated by an engine to a drive shaft of a rotor of said helicopter, comprising:

a transmission case;

a wheel gear fixed to said drive shaft;

a first drive shaft rotatably mounted on said transmission case and axially fixed thereto;

a first pinion fixed to said first drive shaft and meshing with said wheel gear;

a first large helical gear secured to said first drive shaft coaxially with said first pinion;

a second drive shaft rotatably mounted on said transmission case and axially fixed thereto;

a second pinion fixedly secured to said second drive shaft and meshing with said gear wheel;

a second large helical gear secured to said second drive shaft coaxially with said second pinion;

a splined shaft rotatably mounted on said transmission case and axially fixed thereto for inputting said power from said engine;

a jacket spline-fitted to said splined shaft so as axially to slide along said splined shaft and to receive said power from said splined shaft;

a first small helical gear fixedly secured to said jacket coaxially with said splined shaft and meshing with said first large helical gear for splitting said power into a half and for transmitting said half of said power to said first drive shaft through said first large helical gear; and a second small helical gear fixedly secured to said jacket coaxially with said splined shaft and meshing with said second large helical gear for splitting said power into a half and for transmitting said half of said power to said second drive shaft through said second large helical gear.

2. The apparatus according to claim 1, wherein said first small helical gear has the same diameter, the same number of teeth as and an opposite helix angle to said second small helical gear so as to split said power exactly into half.

3. The apparatus according to claim 1, wherein said first large helical gear has the same diameter, the same number of teeth as and an opposite helix angle to said second large helical gear so as to split said power exactly into half.

4. The apparatus according to claim 1, wherein said first pinion has the same diameter and the same number of teeth as those of said second pinion.

5. The apparatus according to claim 1, wherein said first and second pinions have spur gears.

6. The apparatus according to claim 1, wherein said first and second pinions have helical gears.

7. The apparatus according to claim 1, wherein said first and second pinions have double-helical gears.

8. The apparatus according to claim 1, wherein said jacket has a ball spline with a plurality of balls, a retainer for holding said balls so as to split said power more equally.

9. The apparatus according to claim 1, wherein said splined shaft is coated with resin so as to equally split said power.

10. A torque splitting apparatus accomodated in a housing for equally distributing a torque to a first drive shaft mounted on said housing and axially fixed thereto and to a second drive shaft mounted on said housing and axially fixed thereto, comprising:

a splined shaft rotatably mounted on and axially fixed to said housing for inputting said torque;

a jacket spline-fitted to said splined shaft so as axially to slide along said splined shaft and to receive said torque from said splined shaft;

a first driven helical gear fixedly secured to said first drive shaft;

a second driven helical gear fixedly secured to said second drive shaft;

a first drive helical gear fixedly secured to said jacket coaxially with said splined shaft and meshing with said first driven helical gear for splitting said torque into a half and for transmitting said half of said torque to said first drive shaft through said first driven helical gear; and a second drive helical gear fixedly secured to said jacket coaxially with said splined shaft and meshing with said second driven helical gear for splitting said torque into a half and for transmitting said half of said torque to said second drive shaft through said second driven helical gear.

11. The apparatus according to claim 10, wherein said first drive helical gear has a same diameter, a same number of teeth as and an opposite helix angle to those of said second drive helical gear so as to split said torque exactly into half.

12. The apparatus according to claim 10, wherein said first driven helical gear has a same diameter, a same number of teeth as and an opposite helix angle to said second driven helical gear so as to split said torque exactly into half.

13. The apparatus according to claim 10, wherein said jacket has a ball spline with a plurality of balls and a retainer for holding said balls.

14. The apparatus according to claim 10, wherein said splined shaft is coated with resin so as to equally split said torque.

* * * * *